July 9, 1968          M. W. BEVINS          3,392,334
DEVICE FOR MEASURING VOLTAGE BETWEEN HIGH VOLTAGE
ELECTRICAL TRANSMISSION LINES Filed Feb. 13, 1964          2 Sheets-Sheet 1

INVENTOR.
Marvin W. Bevins
BY
William S. Dorman
ATTORNEY

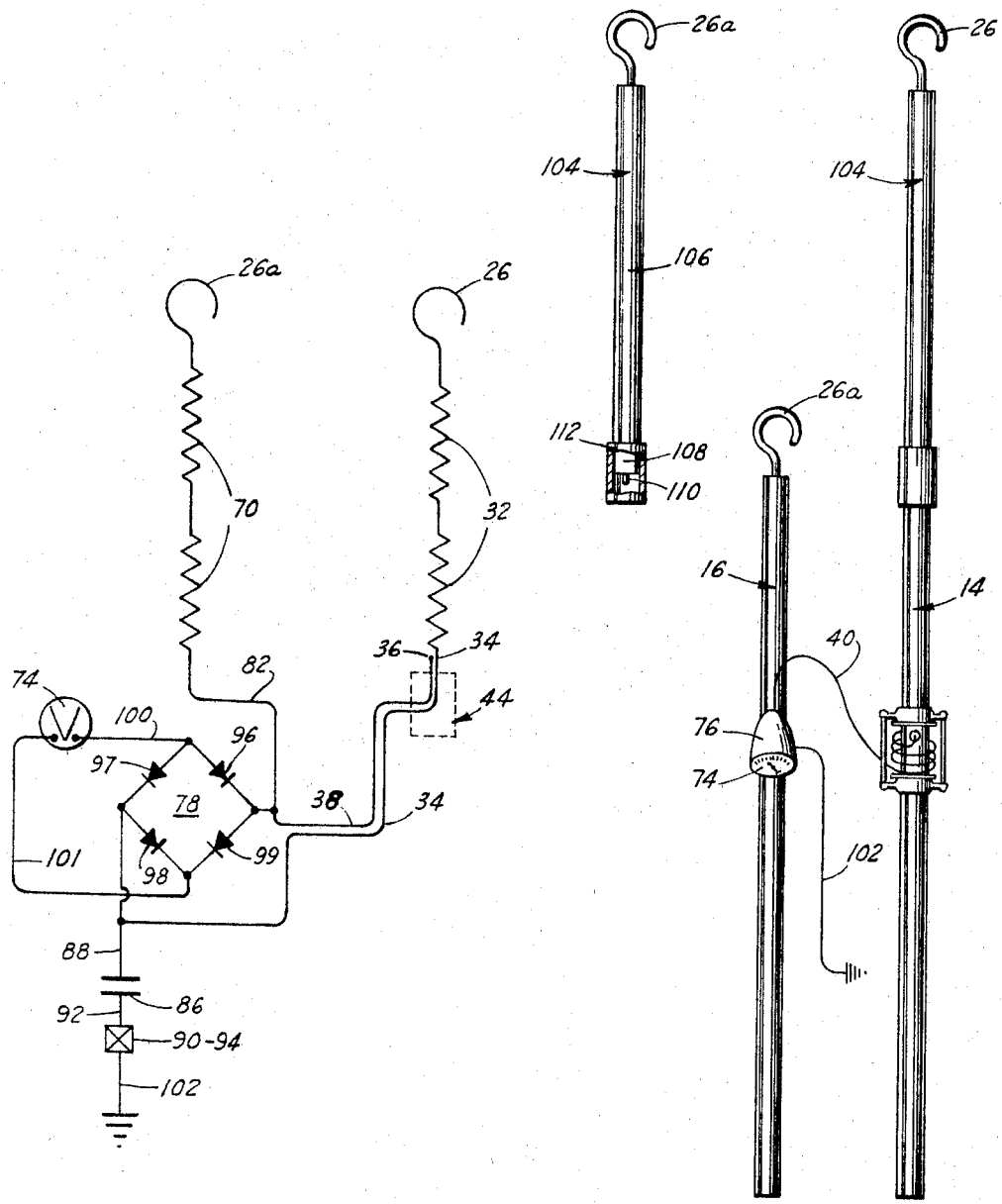

United States Patent Office 3,392,334
Patented July 9, 1968

3,392,334
DEVICE FOR MEASURING VOLTAGE BETWEEN HIGH VOLTAGE ELECTRICAL TRANSMISSION LINES
Marvin W. Bevins, 3137 S. Cincinnati,
Tulsa, Okla. 74105
Filed Feb. 13, 1964, Ser. No. 344,702
10 Claims. (Cl. 324—149)

ABSTRACT OF THE DISCLOSURE

A pair of non-conducting staff members having electrodes at the ends thereof for engaging transmission lines, one electrode being connected through an electrical resistance to a terminal of a voltage measurement means, a two-conductor means connected to a second terminal of the voltage measurement means and extending between the staff members, the other electrode being connected through a second electrical resistance to one conductor only of the two-conductor means and means providing for control of the length of the two-conductor means extending between the staff members. Optional phase determining means including a capacitor provided in the first staff member and having one end connected to the second terminal of the voltage measurement means with means for selectively connecting the other end of the capacitor means to ground.

---

This invention relates to improvements in phasing voltmeters, and more particularly, but not by way of limitation, to a phasing voltmeter designed and constructed for use by linemen on overhead high voltage electrical transmission lines for determining the presence of electrical voltage and/or the phase relationship between electrical leads. This invention is an improvement over my co-pending application Ser. No. 75,258, filed Dec. 12, 1960, and entitled, "Voltage Measurement Device," now Patent No. 3,193,765.

In the transmission and distribution of electrical power, it frequently becomes necessary to connect one transmission or distribution system to another. One example of such an occasion is when a lead or the leads of one line develop a fault so that it becomes necessary to connect the corresponding lead or leads of another line in the same power system thereto for supplying power to the lead. Another example requiring connection of one transmission system to another is in the installation of additional electrical equipment in relatively large industrial establishments, or for increasing the total supply of electrical current for the system, such as by the addition of supplementary power sources. It is absolutely essential that the leads so connected be of the same phase relation as those of the original leads in order to assure uninterrupted service for the electrical system. A mistake in the connecting of the leads with regard to the phase relation can be very serious and could result in the destruction of equipment being serviced by the electrical system.

There are many well known phasing devices in use today but these instruments have many disadvantages. Many commonly available devices of this type utilize a neon lamp, or the like, which is connected in a series electrical circuit extending from a main staff to an auxiliary staff whereby, when conducting portions of the two staffs contact two adjacent high tension lines, and if a high voltage current is flowing through the lines, the neon lamp will be illuminated. These devices may not be entirely indicative of the actual conditions being tested, however, since in paralleling two electrical circuits, one of which is a heavily loaded line, there may be sufficient voltage difference therebetween to cause the neon lamp to glow due to line drop in the more heavily loaded line, even though the lines may be on the same phase.

The present invention contemplates a novel phasing voltmeter for determining the phase relation between two electrical circuits, and is particularly designed and constructed to overcome the disadvantages of devices of this type available today. The novel voltmeter comprises a main staff having a voltmeter provided thereon, and an auxiliary staff having a spool thereon for receiving an insulated cable which electrically connects the electrical portions of the main and auxiliary staffs in an electrical circuit. Both the main staff and the auxiliary staff are provided with resistors which are connected at one end to a conducting probe means, such as a shepherd's hook, for connection with an electrical transmission line and at the other end to the electrically insulated cable extending between the two staffs. The voltmeter is connected in a series circuit with the resistors carried within the main and auxiliary staffs and the conducting probe means and provides a reading of the voltage of the transmission line, which is a distinct advantage over the bulb arrangement as hereinbefore set forth. Furthermore, only that portion of the insulated cable is unwound from the spool carried by the auxiliary staff that is required for a quick and facile reading of the values indicated on the voltmeter, thereby minimizing distortion in the meter reading due to stray capacitance, and precluding the cable from becoming entangled with either the linemen or their other necessary tools.

A particular feature of the present invention involves the provision of the insulated cable as a two-conductor cable whereby the capacity of the two conductors counteract each other along their lengths, thus nullifying the effect of capacitive charging current which would otherwise cause an error in the meter reading. The two-conductor cable thus greatly increases the accuracy of the meter reading. Another important feature of the present invention is the incorporation of a capacitor in one of the staffs which capacitor may be selectively utilized to provide a discernible difference in the voltage readings when the two staffs are (a) connected with the transmission line in one manner and then (b) connected in a reverse manner. This increased voltage differential facilitates the determination of the phase relation between any two lines. Thus, the overall phase relation of all lines in a given system can be predetermined in order that a motor, or other electrical equipment which would be phase responsive, may be correctly connected in the electrical system, to produce the desired direction of rotation of the motor, for example. The novel phasing voltmeter is simple and efficient in operation and economical and durable in construction.

It is an important object of this invention to provide a novel voltmeter for determining the phase relation between two electrical circuits.

Another object of this invention is to provide a novel voltmeter for accurately determining the true voltages of a high tension electrical transmission line.

A still further object of this invention is to provide a novel phasing voltmeter which permits control of the length of the insulated conducting cable extending between the main and auxiliary portions of the device for reducing distortion in the meter readings.

It is another object of this invention to provide a novel phasing voltmeter, particularly designed and constructed for nullifying unsymmetrical capacitive effects in the conducting cable for increasing the accuracy of the meter readings.

A further object of this invention is to provide a novel phasing voltmeter wherein a predetermined capacitive effect may be introduced, as desired, to create a readable difference in voltage measurement merely by reversing the contacts with the same two electrical transmission lines for determining the phase relation (rotation) between the two lines.

It is still another object of this invention to provide a novel phasing voltmeter readily adaptable for use with extremely high voltage transmission lines as well as with transmission lines carrying the more usual voltage.

Other and further objects and advantageous features of the present invention will hereinafter more fully appear in connection with a detailed description of the drawings in which:

FIGURE 2 is an elevational view of a phasing voltmeter embodying the invention and depicting the extension members in combination therewith.

FIGURE 3 is a schematic view of an electrical circuit for the phasing voltmeter of the invention.

Figure 1:
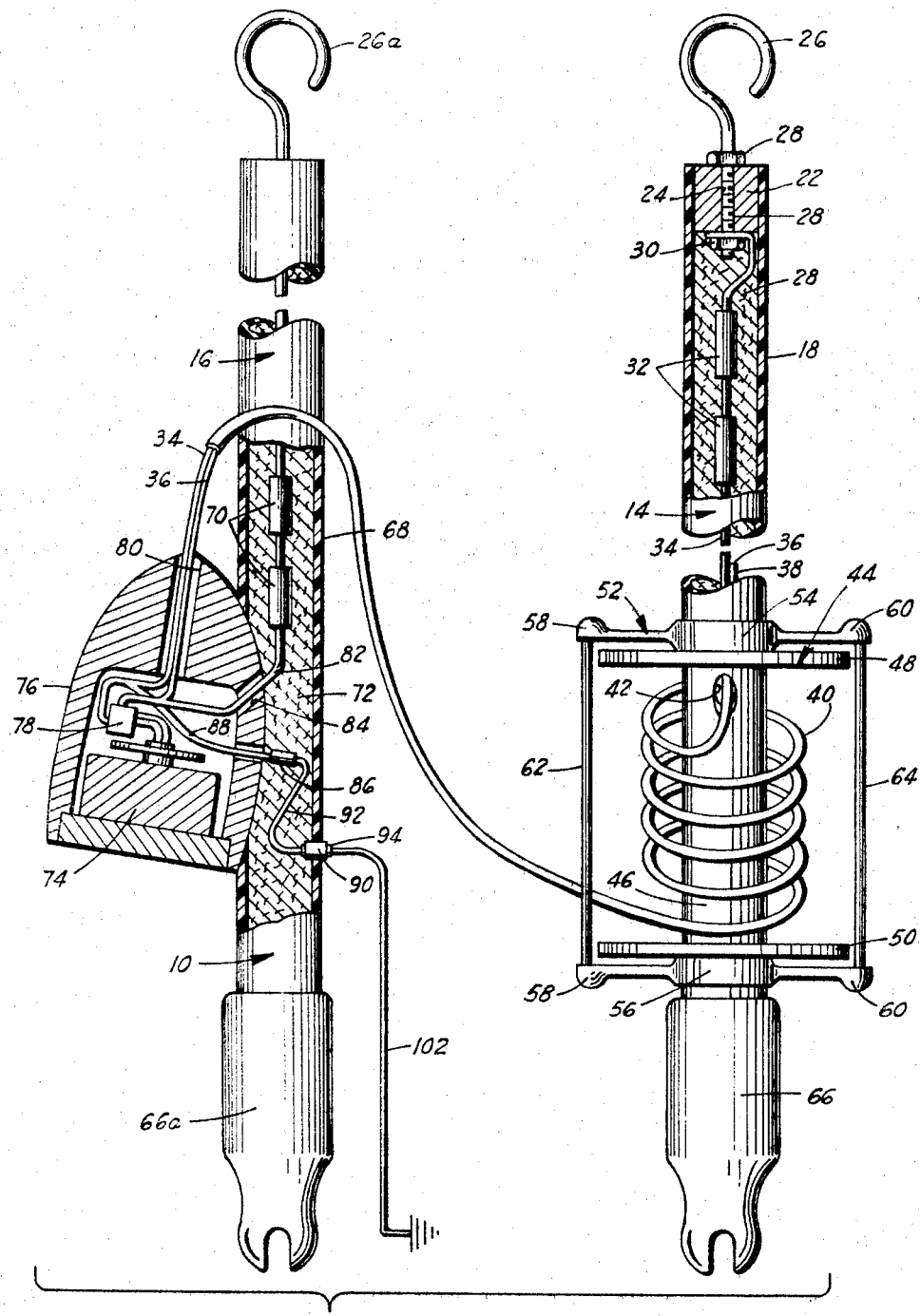
FIGURE 1 is a broken elevational view, partly in section, of a phasing voltmeter device embodying the invention.

Referring to the drawings in detail, reference character 10 generally indicates a phasing voltmeter for indicating voltage values whereby the phasing of one electrical circuit with respect to another may be facilitated, and comprising a first staff 14 and a second staff 16. The staff 14, which may be designated the auxiliary staff, comprises a substantially cylindrical housing 18 constructed from a suitable non-conducting material, such as epoxiglass, or the like, but not limited thereto since any other material having the required qualities, such as wood, would be suitable for use. The housing 18 is filled with a plastic foam material 20 such as epoxy resin, or the like, for a purpose as will be hereinafter set forth. A conducting terminal 22 having a centrally disposed threaded bore 24 extending therethrough is suitably secured in one end of the staff 14, as clearly shown in FIGURE 1. A conducting probe 26 of any suitable configuration, such as a shepherd's hook, or the like, and having a threaded shank portion 28 threadedly secured within the bore 24 of the terminal 22, and locked therein by means of a suitable lock nut 28, as is well known. It is to be understood that the configuration or form of the electrode 26 and the specific method of securing the electrode to the housing 18 is not limited to the precise means depicted herein, and it is within the scope of the invention to utilize substantially any suitable method for accomplishing the same result.

A suitable conducting nut 30 is threadedly secured to the shank 28 and disposed on the inner side of the terminal 22 for connecting a plurality of resistors 32 with the probe 26, as is well known. The resistors 32 may be of any suitable type and provide a predetermined increment of resistance for the instrument 10. These resistors may comprise a plurality of resistors linked in series or one continuous resistor, as desired. The resistors or resistor 32, as the case may be, extend through the interior of the housing 18 and are preferably disposed substantially along the longitudinal axis thereof.

The resistors 32 are retained in the centrally disposed position within the housing 18 by the plastic foam 20, and the foam functions as a cushioning non-conductive insulation to protect the resistors from damage due to impacts encountered during the normal usage of the instrument 10, and strengthens the housing 18 against any transverse bending forces applied thereto. The resistors 32 extend longitudinally through the tubing or housing 18 and the last resistor 32 in the series is connected to a suitable electrical lead 34 in any well known manner. The lead 34 comprises a suitable insulated conductor, and at a point 36 spaced from the said last resistor 32, a second conductor or lead 38 is disposed adjacent the lead 34 and runs parallel thereto to provide a two-conductor cable 40 extending from the point 36 and to the staff 16 as will be hereinafter set forth. The cable 40 extends through an aperture 42 provided in the wall of the tubing 18 and a portion thereof is wound or coiled around a suitable spool 44 whereby the length of the portion of the cable 40 extending between the staffs 14 and 16 may be controlled in accordance with the length necessary during utilization of the instrument 10.

The spool 44 may be of any suitable type, and as disclosed herein, comprises a central core member 46 disposed around the outer periphery of the housing 18 for receiving the wound cable thereon having a pair of oppositely disposed outwardly extending circumferential flanges 48 and 50 provided at the opposite ends thereof for retaining the wound cable on the core portion 46 within the space provided therebetween. In addition, a cable guard device 52 is rotatably disposed on the outer periphery of the housing 18 and encases the spool 44 for cooperating with the flanges 48 and 50 to retain the coils of the cable 40 around the core 46. As depicted herein, the guard 52 comprises a pair of spaced hub members 54 and 56 disposed adjacent the outer surfaces of the flanges 48 and 50, respectively, and suitably journalled on the housing 18. Each hub 54 and 56 is provided with a pair of oppositely disposed radially outwardly extending arms 58 and 60 so arranged that the arm 58 of the hub 54 is in substantial alignment with the arm 58 of the hub 56, and the arm 60 of the hub 54 is in substantial alignment with the arm 60 of the hub 56. A pair of diametrically opposed longitudinally extending shaft members 62 and 64 are secured between the aligned arms 58 and 60, respectively, and preclude accidental uncoiling and unwinding of the cable 40 from the core 46. As the cable 40 is being unwound from the spool 44 during utilization of the instrument 10, the cable leaving the spool 44 will engage one of the arms 62 and 66, and the engagement therebetween will cause the guard 52 to rotate with respect to the housing 18 whereby the portion of the cable 40 retained on the core 46 will be retained in position and there will be no interference with the movement of the cable being unspooled therefrom.

It will be apparent that the end of the housing 18 which is oppositely disposed from the terminal 22 may be provided with an appropriate fitting member 66 for connection of the staff 44 to a suitable non-conducting member or "hot stick" (not shown).

The staff 16, which may be designated as the main staff, is generally similar to the staff 14 and comprises a housing 68 substantially identical with the housing 18 having a terminal (not shown) similar to the terminal 22 provided in one end thereof for receiving a conducting probe 26a, which is preferably of the same type as the probe 26. A plurality of resistors 70 are centrally disposed within the housing 68 in the manner as set forth for the resistors 32 and are retained in position by plastic foam material 72 which is preferably of the same type as the foam material 20. A suitable D-C voltmeter 74 of any well known type is secured in a non-conducting case 76 constructed of wood or plastic, or the like. The case 76 is removably secured to the outer periphery of the housing 68 in any well known manner (not shown) and is preferably positioned thereon in such a manner that the meter 74 will be visible when viewed from the lowermost end of the rod or staff 16. It will be apparent that an appropriate fitting member 66a, similar to the fitting 66, may be suitably secured to the end of the staff 16 oppositely disposed from the probe 26a whereby the staff 16 may be connected with a suitable non-conducting member (not shown), such as a "hot stick."

The voltmeter 74 is suitably electrically connected with a diode bridge 78 which is disposed within the case 76. The two-conductor cable 40 extends through a passageway 80 in the case 76 and into connection with the diode bridge 78 for connecting the resistors 32 therewith. In addition, the resistors 70, which are connected in series with the probe 26 in the same manner as the resistors 32 are connected with the probe 36, are also electrically connected with the diode bridge 78 by a suitable conductor member 82 which extends through an aperture 84 provided in the case 76. A capacitor 86 is disposed within the housing 68 and is electrically connected with the diode bridge 78 by a suitable lead 88 and is also connected to a plug 90 by a lead 92. The plug 90 is disposed in the wall of the housing 68 and secured therein in any suitable manner (not shown) for receiving a grounded jack member 94. There are certain instances of utilization of the instrument 10 wherein it is desired to place the capacitor 86 in the circuit, and other times when it is not desirable to incorporate the capacitor 86 in the circuit. When it is desired to use the capacitor 86, the jack 94 may be inserted in the plug 90, and of course, when it is not necessary to include the capacitor, the jack may be removed from the plug 90.

Referring now to FIGURE 3, the diode bridge 78 consists of four diodes 96, 97, 98 and 99 connected in the manner shown in the drawings, such that the current will flow to the voltmeter 74 in the same direction regardless of the manner in which the two hooks or electrodes 26 and 26a are placed over the electrical transmission lines (not shown). The voltmeter 74 is preferably connected to opposite sides of the diode bridge 78 by suitable leads 100 and 101 as shown in FIGURE 3.

It has been observed in the past that between any two given lead wires a given voltage can be observed on the meter when the hooks or probes are connected over the transmission lines in one manner and that a different reading can be observed in the meter when the positions of the hooks are reversed. However, this difference is not always readily discernible and sometimes is very difficult to observe at all. Therefore, the capacitor 86 (of predetermined value) is connected with the diode bridge by the lead 88 and to the plug 90 by the lead 92, as hereinbefore set forth. The jack 94 is connected to ground by a suitable externally disposed lead 102. Thus, when the jack 94 and plug 90 are engaged the capacitor 86 is connected in the circuit between the diode bridge 78 and ground. Since the current through the capacitor 86 is ninety degrees out of phase with the voltage impressed across it, and since the voltages in the two lines involved in the measurement are also out of phase with respect to each other, it follows that the current through the capacitor 86 will have an additive effect on the voltmeter reading when the hooks are connected in one manner whereas this capacitive current will have a subtracting effect on the reading of the voltmeter when the hooks are reversed. In this manner the phase rotation of the system can be readily determined by merely reversing the hooks and observing the voltage change.

Referring now to FIGURE 2, whereas FIGURE 1 includes the members 66 and 66a for securing the staffs 14 and 16 to non-conducting members, the staffs 14a and 16a as shown in FIGURE 2 are constructed in such a manner that the housings 18 and 68 are sufficiently elongated that the non-conducting members are included as an integral part of the main and auxiliary staffs. In addition, an extension member 104 is provided for each staff 14 (14a) and 16 (16a) for extending the effective range of the phase detecting or voltage reading device. Since the current flowing through an electrical circuit is inversely proportional to the amount of resistance encountered therein, it is necessary to increase the resistance in the electrical series circuit of the instrument 10 when it is desired to use the device to measure the voltage of an electrical transmission line which carries a voltage greater than that measured in normal use of the apparatus. The extension members 104 each comprise a housing 106 constructed of a suitable non-conducting material similar to the housings 18 and 68 which is filled with a plastic foam material (not shown) as hereinbefore set forth. Additional resistors (not shown) similar to the resistors 32 and 70 are centrally disposed within the housing 106 and extend longitudinally therethrough. A pair of spaced terminals 108 (only one of which is shown) similar to the terminal 22 are secured in the opposite ends of the housing 106. One of the terminals 108 is provided with a bolt member 110 extending longitudinally therefrom, and the other of the terminals 108 is provided for receiving one of the electrodes 26 or 26a. The resistors disposed within the housing 106 are electrically connected in series between the electrode 26 (26a) and the bolt 110 in any well known manner. A coupling member 112 is threadedly secured to one end of the housing 106, preferably in the proximity of the bolt 110, and is adapted to receive one end of the staff 14, or the staff 16, therein.

When it is desired to utilize the extension members 104, the probes 26 and 26a may be removed from the staffs 14 and 16, respectively, and the coupling member 112 may be disposed over the end of each of the housings 18 and 68, as particularly shown in FIGURE 2. The bolt 110 may be threadedly engaged with the terminal 22 for placing the additional resistors contained within the extension members 104 in the electrical circuit. The probes 26 and 26a may then be threadedly secured to the terminals disposed in the opposite end of the housings 106, and the staffs 14 and 16, having the extension members 104 secured thereto, may be utilized in conjunction with extremely high voltage transmission lines.

*Operation*

When it is desired to use the instrument 10, the main and auxiliary staffs 16 and 14, respectively, may be removed from an appropriate carrying case (not shown) and selectively secured to non-conducting members or "hot sticks" (not shown) by the fitting members 66 and 66a. The assembled staffs are then manually directed upwardly to the linemen on a pole by means of a hand line. Of course, if the staffs 14a and 16a are used, there is no need for the additional "hot sticks." Since safety regulations normally require two linemen to be used in the phasing of electrical transmission lines, the main staff 16 is grasped by one lineman and the auxiliary staff 14 is grasped by the other lineman. The insulated two-conductor cable 40 is unwound from the spool 44 carried by the auxiliary staff 14 whereby the instrument 10 may be easily handled in a manner to control the length of the cable extending between the two staffs. This control of the degree to which the cable 40 may be draped downwardly during normal usage of the device not only substantially precludes undesirable entangling of the cable with other tools, or with the physical components of the linemen themselves, but also reduces distortion of the voltmeter reading which may be caused by stray or ground capacitance to a minimum. The spool 44 facilities the handling of the staffs 14 and 16 for maintaining the portion of cable extending between the two staffs at substantially the same distance from the ground, or from the transmission line, throughout the length of the cable, thereby maintaining any stray capacitance at a substantially constant level in the cable for minimizing distortion. In addition, the two-conductor cable is provided for substantially nullifying the effect of undesirable unsymmetrical stray currents to greatly increase the accuracy of the voltmeter readings.

The lineman holding the main staff 16 then positions the probe 26a against an uninsulated high voltage transmission line, or if the probe 26a is in the configuration of a shepherd's hook as shown in the drawings, the lineman merely hooks the shepherd's hook over one of the transmission lines. A shepherd's hook may be preferable at times in that it allows a lineman to transfer part of the weight of the tool to the transmission line. The lineman holding the auxiliary staff 14 either touches or hooks the probe 26 over a ground wire so that the lineman holding the main staff may ascertain the voltage between that specific line and ground, and so phase the system in a conventional manner. After the distribution system has been connected to the power lines according to the correct phase relationship, the device 10 may be returned to the ground by a hand line and replaced in its carrying case.

When it is desired to ascertain the phase of a transmission system carrying a higher voltage than is generally measured in normal usage of the instrument 10, the extension members 104 and 106 may be secured to the staffs 14 and 16, and the staffs may be used in the manner hereinbefore set forth. The extension members add a predetermined increment of resistance to the series electrical measurement circuit to permit use of the instrument with lines carrying much higher voltages. For example, whereas the staffs 14 and 16 by themselves may be used for measurement of voltages up to about fifteen kilovolts, the use of the extension members 104 extends the range of the device to a limit of approximately seventy-five kilovolts. It is to be understood that these values only represent typical values and are not in any manner considered to limit the scope of the invention.

When the jack 94 is inserted within the plug 90, the capacitor 86 is introduced into the circuit, and functions to increase the voltage reading in one direction and to decrease the reading of the opposite direction; that is, when the probes 26 and 26a are engaged with two lines in one manner, a first reading will be noted from the voltmeter; and when the probes 26 and 26a are in reverse engagement with the same two lines, a different reading will be noted, thus facilitating the determination of the phase relationship of the two lines. In this manner, the phase relationship between the lines of an electrical transmission system may be readily determined.

From the foregoing, it will be apparent that the present invention provides a voltmeter device for readily determining the phase relation between two electrical circuits, as well as for ascertaining an accurate measurement of the voltage in the electrical transmission lines. Extension members are provided whereby the novel instrument may be readily converted for utilization with transmission lines carrying extremely high voltages. In addition, a capacitor may be selectively introduced into the electrical circuit of the instrument for providing a readily ascertainable distinction in voltage readings upon reversing of the connections of the probe members with two transmission lines for facilitating the determination of the phase (rotational) relationship therebetween. Furthermore, a two-conductor cable is provided, extending between the main and auxiliary staff members, for substantially nullifying the effects of any unsymmetrical capacitive charging current for providing a greater accuracy in the voltmeter readings. The novel phasing voltmeter is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims, without departing from the spirit of the invention.

I claim:

1. In a device of the character described, a first non-conducting staff member having a first electrode carried at one end thereof for engaging a first power lead, voltage measurement means carried by the said first staff member, said first electrode being connected through a first electrical resistance to one terminal of the voltage measurement means, a second non-conducting staff member having a second electrode carried at one end thereof for engaging a second power lead, two-conductor means connected at one end to said voltage measurement means and extending between said first and second staff members, said second electrode being connected to a second electrical resistance, said second electrical resistance being connected to one conductor only of said two-conductor means at the other end thereof, and means providing for control of the length of the two-conductor means extending between the first and second staff members.

2. In a device of the character described, first non-conducting staff means having first electrode means carried at one end thereof for engaging a first power lead, voltage measurement means carried by the said first staff means, said first electrode being connected through a first electrical resistance to one terminal of the voltage measurement means, capacitor means provided in the said first staff member and having one end thereof connected to a second terminal of the voltage measurement means, second non-conducting staff means having second electrode means carried at one end thereof for engaging a second power lead, said second electrode being connected to a second electrical resistance, two-conductor means connected at one end to said second terminal of the voltage measurement and extending between said first and second staff means, said second electrical resistance being connected to one conductor only of said two-conductor means at the other end thereof, means for selectively connecting the other end of the capacitor means to ground, and means provided on the second staff means for permitting control of the length of the two-conductor means extending between the first and second staff means.

3. In a device of the character described, a first non-conducting staff member having a first electrode carried at one end thereof for engaging a first power lead, voltage measurement means carried by the said first staff member, said first electrode being connected through a first electrical resistance to one terminal of the voltage measurement means, a second non-conducting staff member having a second electrode carried at one end thereof for engaging a second power lead, two-conductor means connected at one end to said voltage measurement means and extending between said first and second staff members, said second electrode being connected to a second electrical resistance, said second electrical resistance being connected to one conductor only of said two-conductor means at the other end thereof, means providing for control of the length of the two-conductor means extending between the first and second staff members, and means removably securable to both the first and second staff members for selectively increasing the resistance between the two electrodes and the voltmeter.

4. In a device of the character described, a first non-conducting staff member having an electrode carried at one end thereof for engaging a first power lead, voltage measurement means carried by the said first staff member, said first electrode being connected through a first electrical resistance to one terminal of the voltage measurement means, a second non-conducting staff member having a second electrode carried at one end thereof for engaging a second power lead, two-conductor means connected at one end to said voltage measurement means and extending between said first and second staff members, said second electrode being connected to a second electrical resistance, said second electrical resistance being connected to one conductor only of said two-conductor means at the other end thereof, means removably securable to both the first and second staff members for selectively increasing the resistance between the two electrodes and the voltmeter, capacitor means provided in the first staff member and having one end thereof connected to a second terminal of the voltage measurements means, and means for selectively connecting the other end of the capacitor means to ground.

5. In a device of the character described and as set forth in claim 4 and including means provided on the second staff member for permitting control of the length of the two-conductor means extending between the first and second staff members.

6. In a device of the character described, a first non-conducting staff member having a first electrode carried at one end thereof for engaging a power lead, voltage measurement means carried by the said first staff member, a diode bridge carried by the first staff member and having a pair of opposite terminals electrically connected to two terminals of the voltmeter, first resistor means provided in the first staff member and connected in electrical series between said first electrode and a third terminal of said diode bridge, a second non-conducting staff member having a second electrode carried at one end thereof for engaging a second power lead, second resistor means provided in the second staff member and connected to the second electrode, first conductor means electrically connected between the second resistor means and a fourth terminal of said diode bridge, and a second conductor means disposed parallel with a portion of the first conductor means and having one end connected with the diode bridge and the other end thereof free.

7. In a device of the character described and as set forth in claim 6 and including means for selectively electrically connecting additional resistor means between the first and second electrodes and their respective resistor means.

8. In a device of the character described, a first non-conducting staff member having a first electrode carried at one end thereof for engaging a power lead, voltage measurement means carried by the said first staff member, a diode bridge carried by the first staff member and having a pair of opposite terminals electrically connected to two terminals of the voltmeter, first resistor means provided in the first staff member and connected in electrical series between said first electrode and a third terminal of said diode bridge, capacitor means carried by the first staff member and having one end electrically connected with the diode bridge, a second non-conducting staff member having a second electrode carried at one end thereof for engaging a second power lead, second resistor means provided in the second staff member and connected to the second electrode, first conductor means electrically connected between the second resistor means and a fourth terminal of said diode bridge, second conductor means disposed parallel to a portion of the first conductor means and having one end connected with the diode bridge and the other end thereof free, and means for selectively electrically connecting the other end of the capacitor means to ground.

9. In a device of the character described and as set forth in claim 8 and including extension means for selectively electrically connecting additional resistor means between the first and second electrodes and their responsive resistor means.

10. In a device of the character described, a first non-conducting staff member having a first electrode carried at one end thereof for engaging a power lead, voltage measurement means carried by the said first staff member, a diode bridge carried by the first staff member and having a pair of opposite terminals electrically connected to two terminals of the voltmeter, first resistor means provided in the first staff member and connected in electrical series between said first electrode and a third terminal of said diode bridge, capacitor means carried by the first staff member and having one end electrically connected with the diode bridge, a second non-conducting staff member having a second electrode carried at one end thereof for engaging a second power lead, second resistor means provided in the second staff member and connected to the second electrode, first conductor means electrically connected between the second resistor means and a fourth terminal of said diode bridge, second conductor means disposed parallel with a portion of the first conductor means and having one end connected with the diode bridge and the other end thereof free, plug and jack means for selectively electrically connecting the other end of the capacitor means to ground, extension means engageable with both the first and second staff members for selectively electrically connecting additional resistor means between the first and second electrodes and their respective resistor means, and spool means carried by the second staff to permit control of the length of the first and second conductor means extending between the second resistor means and the diode bridge.

References Cited

UNITED STATES PATENTS

| | | | |
|---|---|---|---|
| 2,128,019 | 8/1938 | Sleeper | 324—72.5 |
| 3,287,642 | 11/1966 | Simkins | 324—149 |

RUDOLPH V. ROLINEC, *Primary Examiner.*

P. A. URIBE, *Assistant Examiner.*